Jan. 17, 1961   B. H. AYRES   2,968,333
VALVE STEM FOR TUBELESS TIRES
Filed Aug. 8, 1958

INVENTOR.
BARROWS H. AYRES
BY Hudson, Boughton,
Williams, David & Hoffmann
ATTORNEYS United States Patent Office 2,968,333
Patented Jan. 17, 1961

2,968,333

VALVE STEM FOR TUBELESS TIRES

Barrows H. Ayres, Arlington Heights, Ill., assignor to The Dill Manufacturing Company, Cleveland, Ohio, a corporation of Ohio Filed Aug. 8, 1958, Ser. No. 753,896

2 Claims. (Cl. 152—427)

This invention relates to a valve stem and, more particularly, to a valve stem of the "snap in" type for use with rims for tubeless tires.

The "snap in" type of valve stem for a tubeless tire is mounted and secured in an opening formed in the tire carrying rim. Rims do not have the same size valve stem opening and some rims may have a "large" opening and others a "small" opening. As illustrative of this the tire rims of most automobiles up to and through the year 1955 were provided with a .621" rim hole. In 1956 the 14" tire rim started to be used and most of these rims are provided with a .453" rim hole.

Obviously different size "snap in" valve stems are required to fit the two different size rim holes or openings. Also rims vary as to other structural dimensions or shapes and are used in different installations, thus necessitating different length "snap in" valve stems to take care of the different situations.

The number of different length "snap in" valve stems required to meet the various situations has been reduced somewhat by the practice of using different length extensions which can be screwed onto the threaded nipple of the insert at the outer end of the valve stem. Notwithstanding this use of extensions it has been necessary for manufacturers to make and for users, jobbers, repairmen and others to carry in inventory at least seven different sizes of "snap in" valve stems and at least three extensions in order to meet all the varying requirements.

An object of the present invention is to provide a "snap in" valve stem so constructed as to interfit different size rim openings.

Another object is to provide a "snap in" valve stem which, in addition to fitting different size rim openings, is of such length that by the use of only a minimum number of extensions all requirements can be met adequately.

A further object of the invention is to provide a "snap in" valve stem of such construction and size that the manufacturer need produce only a single size stem and the users, dealers, jobbers and repair people need maintain in inventory only such one size "snap in" valve stem and a minimum number of extensions for use therewith.

Further and additional objects and advantages not hereinbefore referred to will become apparent hereinafter during the detailed description which is to follow of a preferred embodiment of the invention and which embodiment is illustrated in the accompanying drawings forming a part of this specification and wherein.

Figure 1:
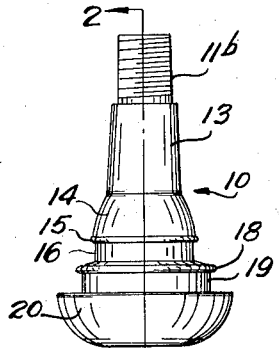
Fig. 1 is an elevational view of a "snap in" valve stem embodying the invention.
Figure 2:
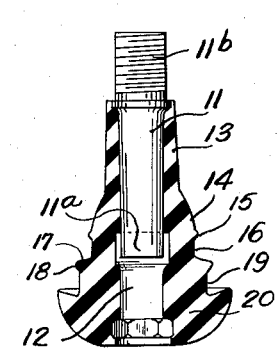
Fig. 2 is a sectional view through the valve stem of Fig. 1 and is taken substantially on line 2—2 of Fig. 1 looking in the direction of the arrows.

The valve stem comprises a rubber body indicated generally at 10 in Fig. 1. A metal or rigid insert 11 is mounted in a bore in the body 10 and has a lower end portion 11a that extends into a counterbore 12 formed in the body 10 adjacent the inner end of the valve stem. The insert 11 is bonded to and integrated with the material of the body 10 throughout the length of the bore in the body, but, it will be noted that the lower end portion 11a of the insert which is within the counterbore 12 is not bonded to the material of the body and has its circumference spaced radially inwardly of the wall of the counterbore. Consequently when longitudinal force is exerted on the insert 11 the material of the body 10 especially in the zone surrounding the counterbore 12 is free to stretch or to attenuate wherein the external diameter of the body at this location is reduced. The arrangement thus far explained is similar to the arrangement in Boyer Patent 2,818,101, December 31, 1957 and is for the same purpose as described in said patent, although more detailed reference as to this purpose later will be set out herein.

Figure 6:
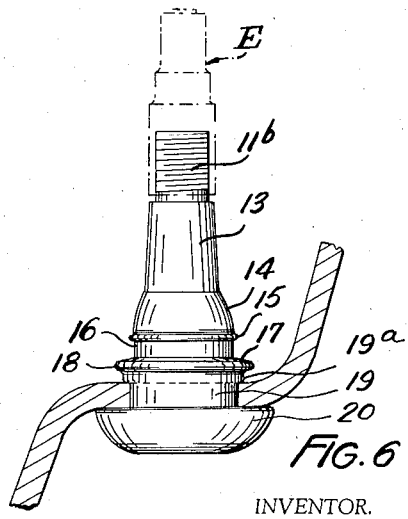
Fig. 6 is a view similar to Fig. 4 but shows the valve stem as applied to the rim having the "large" rim opening, an extension is indicated in dash and dot lines as being secured to the threaded nipple at the outer end of the insert of the stem.

The insert 11 extends beyond the outer end of the rubber body 10 in the form of a threaded nipple 11b for receiving a valve cap or an extension such as the extension E indicated in Fig. 6. The insert 11 is shaped and formed interiorly to have screwed therein the usual valve core or valve insides as will be well understood in the art.

The rubber body 10 at its outer end adjacent to the nipple 11b has a portion 13 of small diameter so as to pass readily through a rim opening and this portion 13 may be cylindrical or slightly downwardly and outwardly tapered. The portion 13 merges into a conical portion 14 of increasing diameter toward its lower end and having at its lower end an annular bead 15. The body 10 has a cylindrical portion 16 below the annular bead 15, the lower end of which joins an outwardly and downwardly inclined larger diameter shoulder 17 that terminates in a bead 18. A cylindrical portion 19 is below the bead 18 of the body and it is of larger diameter than the cylindrical portion 16 previously referred to for a purpose later to be explained. The cylindrical portion 19 merges at its lower end into an enlarged head or base 20. The cylindrical portion 16 of the body 10 is of a diameter adapted to cooperate with and sealingly interfit a "small" opening in the tire rim while the cylindrical portion 19 is of a diameter adapted to do the same with respect to a "large" opening in the tire rim.

The material of the body 10, as already stated, is bonded or vulcanized to the insert 11 only in the bore formed in the body and hence the body 10 throughout the length of the counterbore 12 retains its full elasticity and is longitudinally stretchable.

Figure 4:
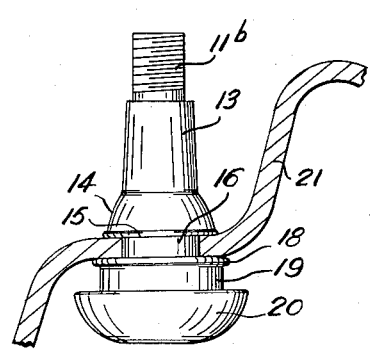
Fig. 4 is a view illustrating the valve stem when applied to the tire rim having the "small" rim opening, said rim being shown in section and the stem being shown in elevation.
Figure 3:
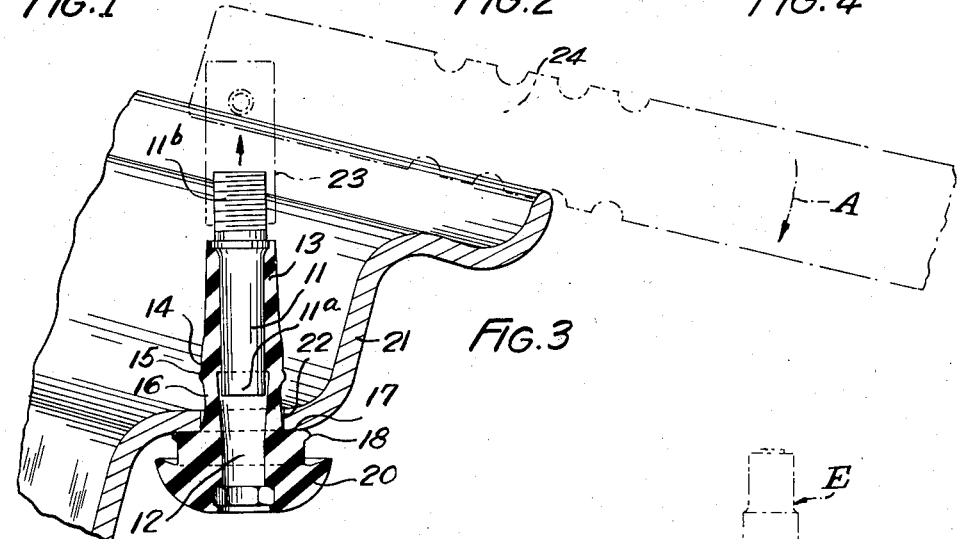
Fig. 3 is a sectional view through the valve stem and a tire rim and shows the valve stem being applied to a rim having a "small" rim opening and with the rubber body of the valve stem attenuated or stretched.

In Fig. 3 of the drawing the valve stem is illustrated as being applied to a tire rim 21 that is provided with a "small" opening, as for instance a .453" opening. The valve stem is so dimensioned that the portion 13 of the body and the smaller diameter end of the conical portion 14 thereof will pass into and through the opening 22 in the tire rim when the valve stem is inserted from the inner side of the rim. As shown in Fig. 3 these referred to portions of the valve stem are inserted through the opening 22 of the rim 21 from the underside, as viewed in the drawing, until the conical portion 14 engages the rim then the pivoted socket 23 of a suitable tool 24 is screwed onto the threaded nipple 11b of the insert 11. This tool may fulcrum on an edge of the tire rim and when force is applied thereto in the direction of the arrow A in Fig. 3 longitudinal force is exerted on the insert 11 and valve stem body and the latter is attenuated or stretched, particularly the larger diameter end of the conical portion 14 and the cylindrical portion 16, with a resultant reduction in the diameter thereof. Prior to being attenuated or stretched the large diameter end of the conical portion 14 and the cylindrical portion 16 of the body are of somewhat greater diameter than the diameter of the opening 22 in the rim. However, the stretching or attenuation of the body reduces the diameters of the portions referred to so they will pass through the rim opening 22. The longitudinal force is exerted on the valve stem by the tool 24 until the surface 17 and bead 18 of the body 10 engage the underside of the rim 21 and the bead 15 has passed through the rim opening, whereupon the longitudinal force being applied to the insert 11 and valve body 10 is released and then the material of the body 10 contracts and tends to resume its normal external diameters, particularly as to the cylindrical portion 16 and the conical portion 14 which, as stated, are not bonded to the insert 11 and have their full elasticity. This results in the portion 14 returning to its normal size and configuration, as shown in Fig. 4, and with its lower end with the bead 15 engaging the rim 21. Also the result is that the cylindrical portion 16 in tending to return to its normal external diameter in the rim opening 22, tightly engages the circumferential wall of the opening with an air-sealing and stem-retaining contact therewith. The material of the portion 16 which cannot be accommodated in the opening 22 flows into the portion 14 and enlarges the latter to a small extent. The valve stem is mounted now in the "small" rim opening. The cylindrical portion 19 now is spaced from the inner side of the rim and will be within the tubeless tire.

Figure 5:
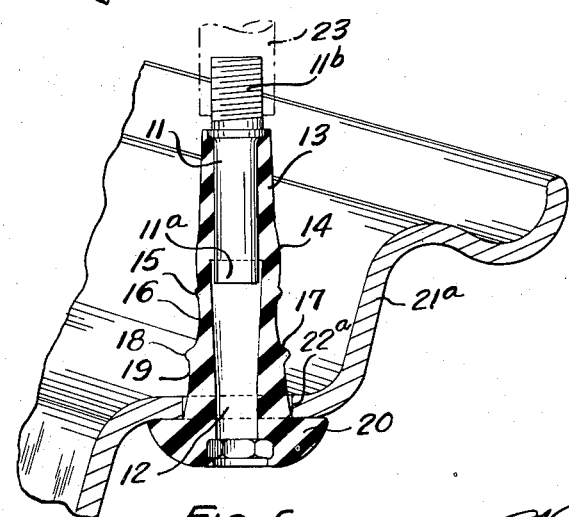
Fig. 5 is a view similar to Fig. 3 but shows the valve stem being applied to a rim having a "large" rim opening.

Fig. 5 is similar to Fig. 3 and shows the stem being applied to a rim 21a that is provided with a "large" rim opening 22a, in this instance for example, a rim opening of .625". The tool 24 is used in the same manner to apply the longitudinal force to the insert 11 and the body 10 is stretched or attenuated. In this instance the conical portion 14 with the bead and the cylindrical portion 16 can pass through the "large" opening 22a without reduction in diameter due to stretching.

The longitudinal stretching of the body 10 reduces the maximum normal diameter of the surface portion 17 and the bead 18 as well as the cylindrical portion 19 so that said portions pass through the "large" opening 22a. The cylindrical portion 19, as previously stated, is normally of a diameter slightly greater than the diameter of the "large" opening 22a. When the longitudinal force is released after the base 20 engages the inner side of the rim 21a, the material in the attenuated or stretched body 10 tends to return to its normal contracted condition with the result that the portions 17 and 18 expand back to their maximum normal diameters, as indicated in Fig. 6, while the cylindrical portion 19 tends to return to its normal maximum diameter. This results in the cylindrical portion 19 having a tensioned tight air-sealing and stem-retaining fit in the stem opening 22, while the shoulder formed by the head 20 is in contact with the inner side of the rim 21a. The material of the portion 17 which cannot be accommodated in the opening 22 forms a bulge over the rim below the bead 18 as indicated at 19a in Fig. 6.

It will be seen from the above description that the single stem can be used with a rim 21 having a "small" rim opening 22 or it can be used with a rim 21a having a "large" rim opening 22a. Consequently the single valve stem will function selectively with both types of rims where heretofore it required two valve stems, one having a cylindrical portion of a diameter to function with the "small" opening rim and the other having such portion sized to function with the "large" opening rim.

As previously stated, it has been necessary to make and to carry in inventory a plurality of different dimensioned stems and extensions to meet the requirements of "small" and "large" rim openings and the length requirements of rim shape and dimensions. Also to meet the conditions it was necessary to provide a plurality of extensions, such as the extension E indicated in Fig. 6, and of different lengths.

As already stated, the valve embodying the present invention will fit either a "small" or "large" rim opening, i.e., either a .453" or a .625" rim opening.

If this valve stem is made of the length most frequently needed then with one or two extensions of suitable length practically all of the situations heretofore requiring a multitude of different stems and a plurality of extensions of different lengths can be taken care of.

It will be clear from the foregoing that the stem embodying the invention has evident advantages both from the standpoint of manufacturing and also from the inventory standpoint.

Although a preferred embodiment of the invention has been illustrated and described herein it will be understood that the invention is susceptible of various modifications within the scope of the appended claims.

Having thus described my invention, I claim:

1. A snap-in valve stem interchangeably usable with different tubeless tire rims having respectively different size rim openings for a valve stem; said stem comprising an elastic body having at one end an enlarged base of a diameter greater than the diameter of any maximum size rim opening in which the valve stem would be mounted, said body having a bore therein extending a substantial distance from the other end of the body toward said base and communicating with a counterbore in the body, said body having a first portion extending from said other end thereof toward said base and of a diameter smaller than any rim opening in which the valve stem would be mounted, said body having a conical portion merging with said first portion and the large end of which is toward said base, said body having a first cylindrical portion surrounding said counterbore and adjoining the large end of said conical portion and of less diameter than said large end, said body at the end of said first cylindrical portion having an annular substantially planar shoulder facing toward the large end of said conical portion and of a diameter greater than the diameter of said first cylindrical portion and the large end of said conical portion, said body intermediate said shoulder and said base having a second cylindrical portion of greater diameter than said first cylindrical portion but less than the diameter of said shoulder and said base, and a rigid insert for a valve core extending from beyond said other end of the said body and into the bore and counterbore therein and bonded to said body throughout the length of said bore but free from connection to said body within said counterbore whereby longitudinal force applied to said insert in a direction away from said base attenuates said body intermediate its ends to reduce the external diameter thereof and allow the valve stem to be inserted through rim openings of different size until one or the other of the cylindrical portions of the body is in a rim opening and thereafter upon termination of said force said attenuated body will tend to resume its normal dimensions intermediate its ends and one or the other of said cylindrical portions thereof will be tightly fitted in the rim opening with either said shoulder or said base of the body in engagement with the inner side of the rim.

2. A snap-in valve stem as defined in claim 1 wherein the circumference of the large end of said conical portion and the circumference of said shoulder of the body are provided with integral outwardly extending beads.

References Cited in the file of this patent

UNITED STATES PATENTS 2,449,754     Seitz  ----------------- Sept. 21, 1948

FOREIGN PATENTS 519,851     Italy ------------------ Mar. 16, 1955
1,126,219     France ----------------- July 23, 1956
(Corresponding Great Britain 781,955, Aug. 2, 1957)
(Corresponding U.S. Patent 2,862,539, Dec. 2, 1958)